US008160884B2

(12) United States Patent
Roth et al.

(10) Patent No.: US 8,160,884 B2
(45) Date of Patent: Apr. 17, 2012

(54) METHODS AND APPARATUS FOR AUTOMATICALLY EXTENDING THE VOICE VOCABULARY OF MOBILE COMMUNICATIONS DEVICES

(75) Inventors: Daniel L. Roth, Boston, MA (US); Jordan Cohen, Gloucester, MA (US); Elias P. Behrakis, Dracut, MA (US)

(73) Assignee: Voice Signal Technologies, Inc., Woburn, MA (US)

( * ) Notice: Subject to any disclaimer, the term of this patent is extended or adjusted under 35 U.S.C. 154(b) by 1050 days.

(21) Appl. No.: 11/347,666

(22) Filed: Feb. 3, 2006

(65) Prior Publication Data

US 2006/0173683 A1    Aug. 3, 2006

Related U.S. Application Data

(60) Provisional application No. 60/649,806, filed on Feb. 3, 2005.

(51) Int. Cl.
*G10L 21/00* (2006.01)
(52) U.S. Cl. .................................................. 704/270.1
(58) Field of Classification Search .................. 704/10, 704/251, 270.1
See application file for complete search history.

(56) References Cited

U.S. PATENT DOCUMENTS

| | | | |
|---|---|---|---|
| 5,613,036 A | 3/1997 | Strong | |
| 5,819,220 A | 10/1998 | Sarukkai et al. | |
| 6,154,526 A | 11/2000 | Dahlke et al. | |
| 6,167,117 A | 12/2000 | Will | |
| 6,463,413 B1 * | 10/2002 | Applebaum et al. | 704/256.2 |
| 6,490,557 B1 * | 12/2002 | Jeppesen | 704/235 |
| 6,640,249 B1 * | 10/2003 | Bowman-Amuah | 709/228 |
| 6,684,185 B1 * | 1/2004 | Junqua et al. | 704/243 |
| 6,738,741 B2 * | 5/2004 | Emam et al. | 704/251 |
| 6,789,057 B1 * | 9/2004 | Morimoto et al. | 704/2 |
| 6,823,307 B1 | 11/2004 | Steinbiss et al. | |
| 6,973,427 B2 * | 12/2005 | Hwang et al. | 704/249 |
| 7,027,987 B1 * | 4/2006 | Franz et al. | 704/236 |
| 7,035,806 B2 * | 4/2006 | Kojima et al. | 704/275 |
| 7,047,199 B2 * | 5/2006 | Kojima et al. | 704/275 |
| 7,216,073 B2 * | 5/2007 | Lavi et al. | 704/9 |
| 7,292,978 B2 * | 11/2007 | Endo et al. | 704/243 |
| 7,366,668 B1 * | 4/2008 | Franz et al. | 704/252 |
| 7,668,885 B2 * | 2/2010 | Wittke et al. | 707/705 |
| 2002/0087315 A1 | 7/2002 | Lee et al. | |

(Continued)

FOREIGN PATENT DOCUMENTS

EP    0 854 417    7/1998

(Continued)

OTHER PUBLICATIONS

Doddington, G., "Speaker Recognition based on Idiolectal Differences between Speakers", *National Institute of Standards and Technology, USA*, pp. 2521-2524, Sep. 2001.

(Continued)

*Primary Examiner* — Michael N Opsasnick
(74) *Attorney, Agent, or Firm* — Sunstein Kann Murphy & Timbers LLP (57) ABSTRACT

The invention is a method of improving the performance of a speech recognizer. The method generally involves: providing a lexicon for the speech recognizer; monitoring a user's interaction with a network; accessing a plurality of words associated with the monitored interaction; and including the plurality of words in the lexicon.

12 Claims, 5 Drawing Sheets

U.S. PATENT DOCUMENTS

| | | | |
|---|---|---|---|
| 2002/0087328 A1 | 7/2002 | Denenberg et al. | |
| 2003/0078777 A1 | 4/2003 | Shiau | |
| 2003/0078778 A1* | 4/2003 | Emam et al. | 704/251 |
| 2003/0191639 A1 | 10/2003 | Mazza | |
| 2004/0220809 A1* | 11/2004 | Wang et al. | 704/257 |

FOREIGN PATENT DOCUMENTS

| | | |
|---|---|---|
| EP | 0 945 851 | 9/1999 |

OTHER PUBLICATIONS

Dragon Naturally Speaking 8, User's Guide, Oct. 2004, Version 8 Professional, Medical, and Legal, Preferred and Standard Editions.

Ramaswamy, G. et al., "A Pervasive Conversational Interface for Information Interaction", IBM Thomas J. Watson Research Center, Yorktown Heights, NY.

* cited by examiner

METHODS AND APPARATUS FOR AUTOMATICALLY EXTENDING THE VOICE VOCABULARY OF MOBILE COMMUNICATIONS DEVICES

CROSS-REFERENCE TO RELATED APPLICATIONS

This application claims benefit to U.S. Provisional Application 60/649,806, filed Feb. 3, 2005, the entire contents of which are incorporated herein by reference.

TECHNICAL FIELD

This invention relates to mobile communication devices having speech recognition capabilities.

BACKGROUND

Modern mobile communications devices (MCDs) offer more functionality than the traditional single use mobile speech telephone. These devices can include an address book, a calendar, a web browser, a digital music player, an emailer, a text messager, a word processor, a camera, and other applications. User-specific collections of text data are typically associated with each of these applications. For example, an address book typically contains the proper names of the user's contacts, and the digital music player includes music descriptors of the user's music collection, such as artist and song names. As the number of applications resident on a mobile communications device proliferates, these collections of text data can represent an increasingly large body of the user's personal information.

Speech recognition capabilities are often included in these devices for command-and-control of the device and as an input modality for one or more applications. Recently, some mobile devices have included a large vocabulary (about 30,000 words) speaker-independent speech recognizer to enable users to perform speech-to-text messaging. However, the vocabularies of such speech recognizers are predetermined and do not take advantage of collections of the user's personal information that may be resident on the mobile device.

SUMMARY OF THE INVENTION

In general, in one aspect, the invention features a method of improving the performance of a speech recognizer. The method involves: providing a lexicon for the speech recognizer; monitoring a user's interaction with a network; accessing a plurality of words associated with the monitored interaction; and modifying the lexicon based on at least one of the plurality of words to improve the performance of the speech recognizer.

Other embodiments include one or more of the following features. The speech recognizer runs on a mobile device, and accessing the words involves downloading the words from a server to the mobile device. The speech recognizer is located on a device connected to a network. The network is a data network, such as the Internet, or a telephone network. When the network is the Internet, monitoring a user's interaction with a network involves monitoring the user's interaction with a Web browser, and accessing words that are associated with the user's interaction with the Web browser. The accessed words are obtained from at least one of queries, search results, and Web pages accessed as a result of the user's interaction with the Web browser. When the user interacts with a telephone network, the device monitors the user's voice communication with one or more other parties via the telephone network, accessing words that are associated with the user's voice communication with the one or more other parties via the telephone network. The words are accessed dynamically, upon receipt of input from the user, at periodic intervals, or upon the occurrence of an event. The device biases the speech recognizer in a manner that is based on a frequency of occurrence in the monitored interaction of the accessed words. The monitoring also includes recording a classification of each of the words, and biasing the speech recognizer in a manner that is based on the classification of each of the plurality of words. The monitoring further includes recording a usage context of each of the plurality of words, and biasing the speech recognizer in a manner that is based on the usage context associated with each of the plurality of words.

In general, in another aspect, the invention features a method implemented on a mobile device. The method involves: providing a lexicon for the speech recognizer; monitoring a user's interaction with a network; capturing a plurality of words associated with the monitored interaction; and adding the captured plurality of words to the lexicon.

Other embodiments include one or more of the following features. Monitoring a user's interaction with a network involves monitoring the user's interaction with a Web browser, and capturing words that are associated with the user's interaction with the Web browser.

In general, in yet another aspect, the invention features a method of extending a speech vocabulary on a mobile device having a speech recognizer. The method involves: storing on the mobile device a lexicon for the speech recognizer; storing on the mobile device a plurality of words, the plurality of words being associated with a mobile user's interaction with a web browser resident on the mobile device; and importing the plurality of words into the lexicon. In another embodiment, the words include search terms entered into the browser by the mobile user and words contained within results returned by searches conducted using the search terms.

In general, in still another aspect, the invention features a method of extending a speech vocabulary on a mobile device having a speech recognizer, the method involving: storing on the mobile device a lexicon for the speech recognizer, the lexicon including a first plurality of words; storing on the mobile device a second plurality of words and, for each word of the second plurality of words, storing a usage context associated with that word, the second plurality of words being associated with an application other than the speech recognizer; and importing the second plurality of words and their associated usage contexts into the lexicon.

Other embodiments include one or more of the following features. At least one of the second plurality of words is associated with a usage context of a proper name. The speech recognizer is biased towards selecting candidate words from the lexicon that have a usage context that corresponds to the usage context of a word to be recognized by the speech recognizer.

In general, in an additional aspect, the invention features a method of extending a speech vocabulary on a mobile device having a speech recognizer, the method involving: storing on the mobile device a lexicon for the speech recognizer, the lexicon including a plurality of words; storing a second plurality of words on the mobile device, the second set of text words being associated with an application other than the speech recognizer; for each word in the second plurality of words, recording a frequency of use of the word; and importing the second plurality of words and their associated usage frequencies from the stored set of text words into the lexicon. In another embodiment, the speech recognizer selects candidate words from the lexicon based at least in part on the candidates' usage frequency.

DETAILED DESCRIPTION

Figure 1:
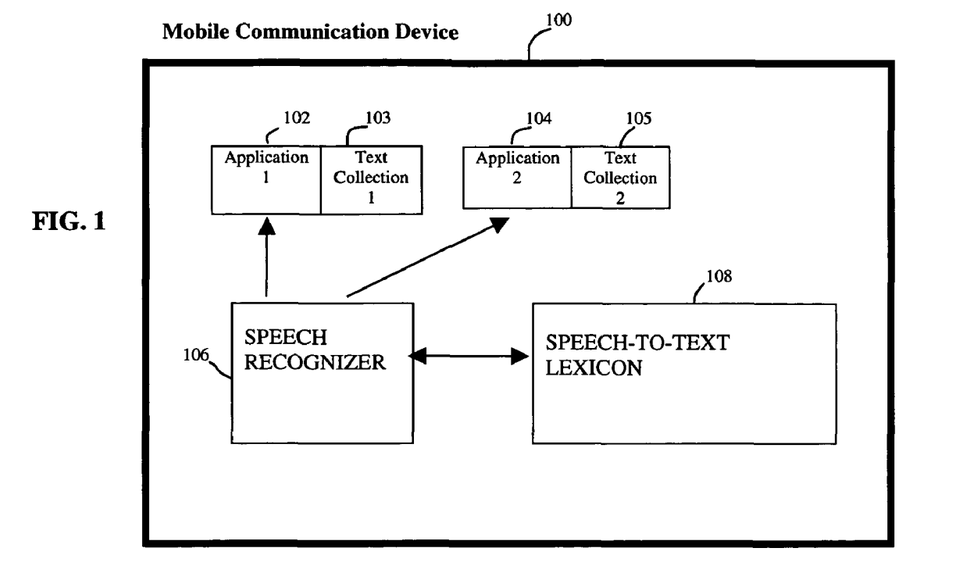
FIG. 1 is a block diagram of a mobile communications device having speech recognition capability.

Selected components of a multi-function MCD 100 with speech recognition capability are shown in FIG. 1. The device includes applications 102 and 104, each of which enables the device to perform a specific function, e.g., text messaging, contact lookup in a phonebook. Collections of text 103 and 105 are associated with each application. The text collections are stored in a form suitable for access by its associated application, such as in a text file, or in a database. When a particular application is running, it draws upon words or phrases within its associated text collection. The text collections typically include text that is personal to the owner of the MCD. For example, the text collection associated with an address book includes the user's contact names and other contact information. Other examples are given below.

MCD 100 also includes speech recognizer 106. Speech recognizer 106 receives speech input and attempts to recognize the spoken words by matching them against entries stored in speech-to-text lexicon 108. The lexicon contains a set of words, each word having a text representation as well as a corresponding pronunciation. When a spoken word is recognized, the speech recognizer passes the recognized word to the application that requested the input. The word might represent a command to the application, or entry of information within the application.

MCD 100 includes a mechanism for enlarging the contents of speech-to-text lexicon 108 that operates by importing words from text collections 103 and 105 associated with applications 102 and 104, respectively. Once incorporated into the lexicon, these words extend the vocabulary of speech recognizer 106. This added vocabulary is likely to be of particular value to the user because it includes words the user has selected for use in connection with other applications, and thus it forms part of the user's personal language space. With the benefit of vocabulary extension, the speech recognizer can recognize a word initially associated with any one of the applications when the user is using either the original application associated with the word, or any other application on the MCD. Furthermore, the user obtains the vocabulary extension without needing to manually input or download the words into the lexicon.

Figure 2:
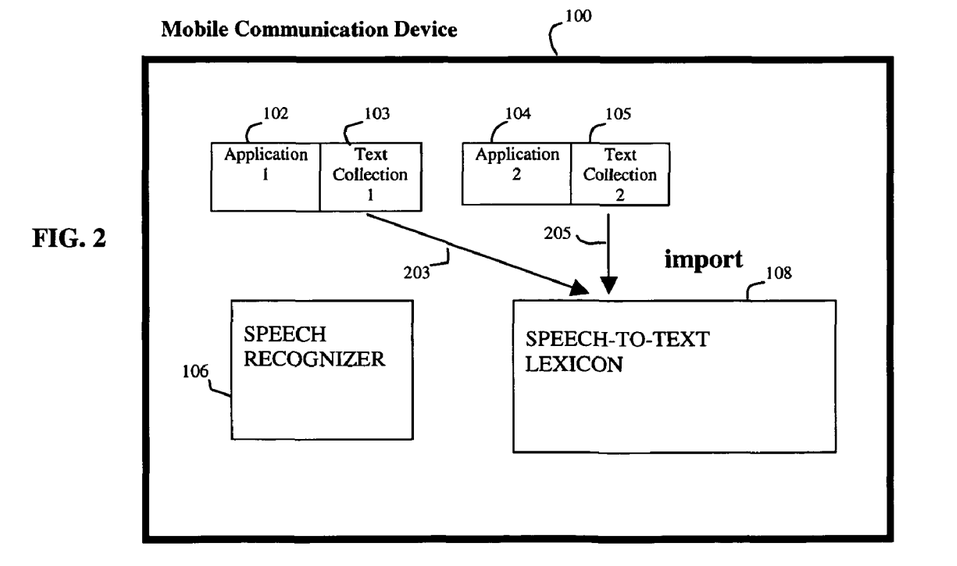
FIG. 2 is a block diagram of a mobile communications device illustrating the flow of information when the speech vocabulary is extended.

FIG. 2 illustrates the flow of information within MCD 100 during vocabulary extension. The MCD imports text collections 103, 105 as illustrated by arrows 203, 205 into speech-to-text lexicon 108. The process is further illustrated in FIG. 3. MCD 100 identifies its resident text collections (step 302). MCD 100 is already aware of the manufacturer-supplied applications, and uses pointers provided by each application that locate the text collections. MCD 100 is also aware of applications that are downloaded after the device is shipped. As with the manufacturer-supplied applications, each of the downloaded applications has a pointer to its associated text collection. In step 304, MCD 100 determines which text collections are to be used for importation of text into the speech-to-text lexicon. The unit has two modes: automatic and manual. In automatic mode, the user sets the device to refer only to specified text collections. The user also specifies how often the unit performs the extension operation. For example, the user sets the device to refer only to collection 103, and to do so only when the user has added one or more words to the collection. Alternatively, the user could set specific time intervals to perform the extension, such as daily or weekly. In manual mode, the user requests each vocabulary extension operation and selects which text collections to use. In step 306, the system selects what text to import from each of the text collections selected in step 304. As for step 304, the device has automatic and manual modes. In automatic mode, the user specifies rules for selecting the words to import. For example, the user specifies that the system import proper names only. In manual mode, the device prompts the user to select or reject each word that is a candidate for addition to the lexicon. In both automatic and manual modes, the unit checks each selected word using an embedded look-up function to determine if it is already present in the lexicon. If the unit finds the word, it ignores the word. If it does not find the word, it adds the word to the list of words being imported. The system maintains a local data structure to keep track of words that are already in the lexicon, or words that have been rejected for the extension process for some other reason. This enables the system to skip unwanted words during subsequent vocabulary extension operations, thereby making text selection more efficient.

Figure 3:
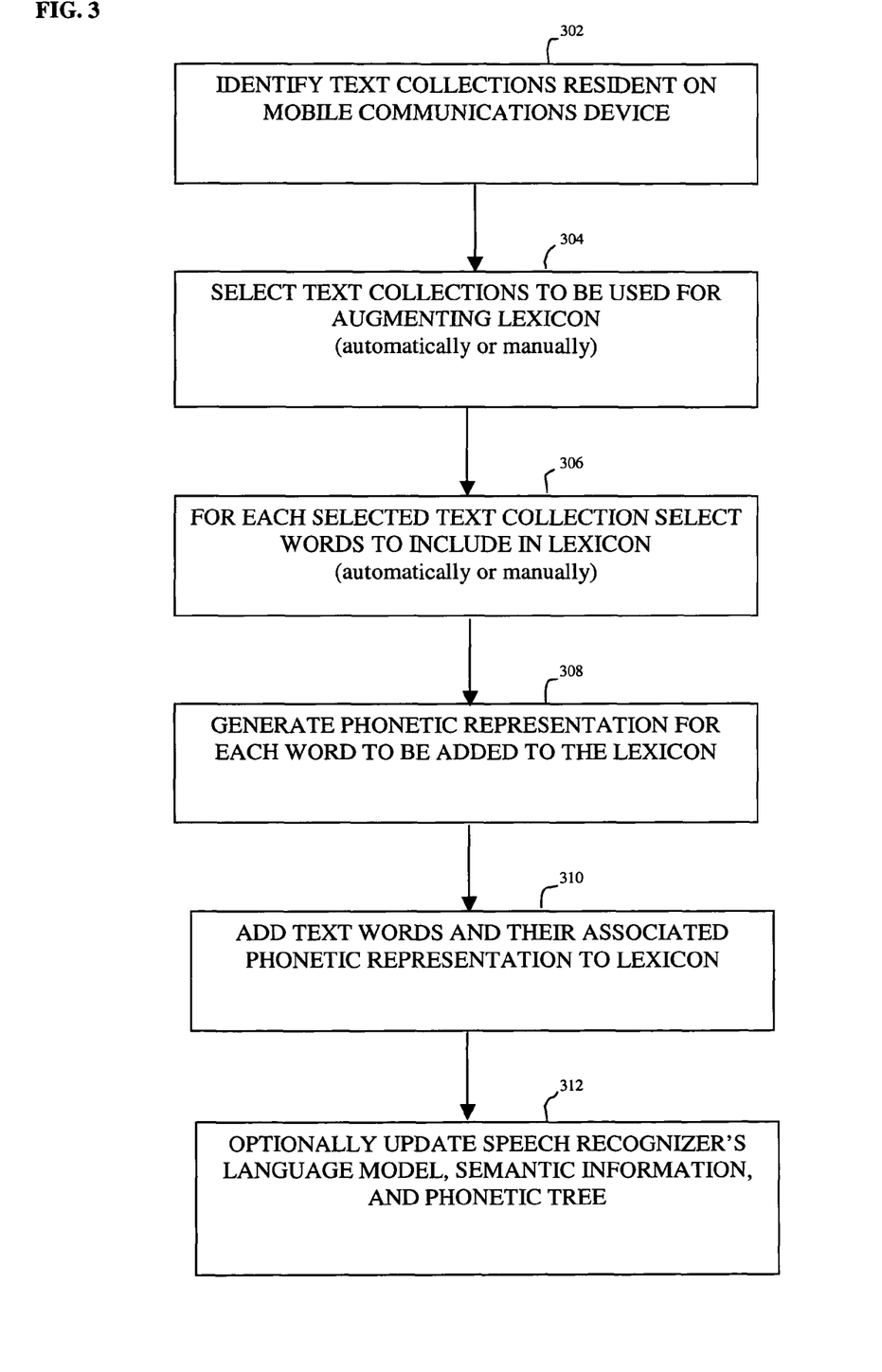
FIG. 3 is a flow diagram illustrating the steps of the speech recognition vocabulary extension process.

When one or more words have been selected for importation into the lexicon, the device generates the pronunciation for each word and stores them as phonetic representations (step 308). The generation of a pronunciation from a text word is well known in the art. The device adds the selected text words, together with their pronunciations, to the lexicon (step 310). In some languages, where straightforward rules govern pronunciation, the speech recognizer contains an algorithm for generating the pronunciation from the text, and the lexicon does not store a complete list of pronunciations; rather, the system generates pronunciations on the fly, as needed.

The recognizer attempts to recognize speech by matching speech input against acoustic representations of the words in the lexicon. Therefore, before the unit can recognize speech, the recognizer requires an acoustic representation of the words in the lexicon. The recognizer obtains the required acoustic representation by means of an acoustic model that converts the pronunciations into acoustic representations.

In addition to adding text and pronunciations to the lexicon, the system might perform other actions to improve the speed and/or accuracy of the speech recognizer (step 312). For example, if a phonetic tree is being used to prune the speech recognizer's search, the system adds the newly imported pronunciations to the tree. If semantic information is available for a word, and the speech recognizer is capable of using semantic information, the system adds that information to the recognizer to improve the speed and accuracy of the speech recognizer.

For example, in a class language model, the recognizer uses the context to predict what class a speech-input word belongs to, and biases its lexicon search in favor of members of that class. For example, an email address is more likely than a name when entering the address field of an email application, while a nickname might be expected in a document following the word "dear." In a probabilistic model, the recognizer stores a probability that a word in a phrase or sentence belongs to a particular class based on the classes of one or more words that immediately precede it in the phrase or sentence. The recognizer then prioritizes its search to words belonging to the expected class based on the classes of preceding words. Thus, if a class language model is being used with the speech recognizer, the class of an imported word is imported into the recognizer. Examples of classes are proper names, nicknames, and email addresses. The source of an imported text word can indicate its class. For example, a word imported from the "last name" field of the device's address book probably belongs to the class of proper names, while a word coming from the "email address" field in an emailer probably belongs to the email address class.

The algorithm can also extend the lexicon vocabulary to include commands recognized by one or more applications on the MCD. As with the text collections, the algorithm locates these commands via pointers within each application. Such commands are typically stored in a data structure, such as a text file. In some cases, the system identifies the commands by searching for unencrypted text strings within the application code. The commands sometimes include carrier-specific additions representing special functions offered by mobile network providers. The system locates these in the same way it locates the standard commands.

In some devices, the speech-to-text lexicon supports a large vocabulary recognizer, the lexicon having as many as 30,000 words. The initial vocabulary of the lexicon is selected by the device manufacturer, and will usually not contain vocabulary that is specific to a particular user. Even though such a system has a good chance of recognizing standard spoken vocabulary, the lexicon will not include some or all of the user's text collections 103, 105. The vocabulary extension described above therefore serves to customize and enhance the speech recognition capability even in devices equipped with large-vocabulary speech recognizers.

Although FIG. 1 shows two applications, any number of applications may be present in the MCD, each with its own text collection, assuming sufficient memory and computational capabilities are present. Typically, these text collections include personal information that a user enters when using an MCD application. They also include word lists downloaded by the user in connection with an application. The user imports these into the device over-the-air using the standard cell phone interfaces, over the web, through short-range wireless systems, such as Bluetooth or Wi-Fi, or with cable connections to an external computing device. Such data could be a collection of topic-specific words that could be used for spell checking, auto-completion of words during text entry, and other purposes. Topics can relate to professional or personal interests. For example, a doctor could have downloaded a set of medical terms. A sports fan could have a set of words relating to a favorite team.

Figure 4:
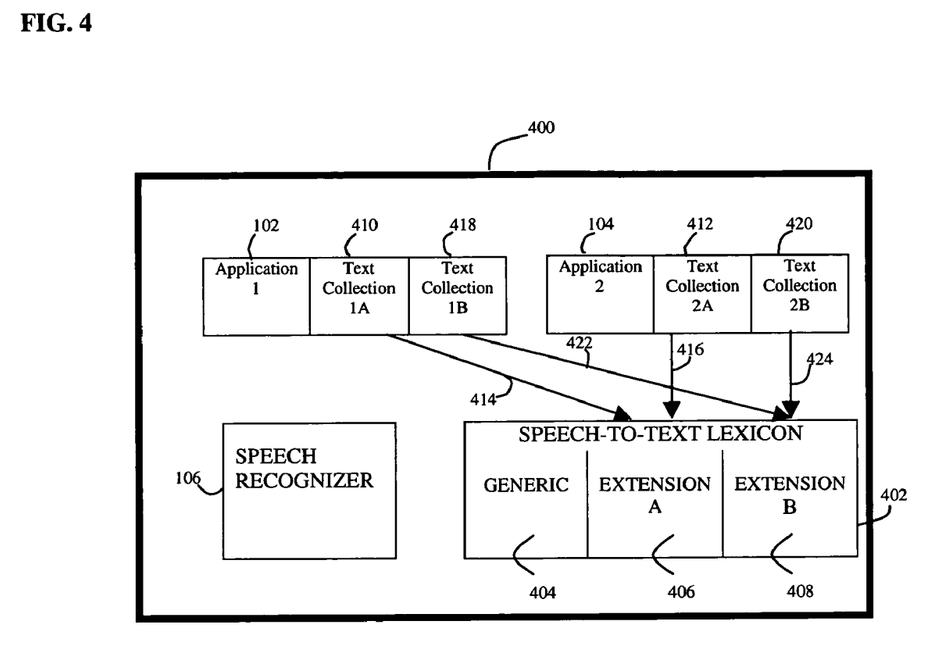
FIG. 4 is a block diagram of a multi-user mobile communications device illustrating the flow of information when the speech vocabulary is extended.

The MCD could have more than one user, each user having their own text collections. Each user performs the vocabulary extension process independently. FIG. 4 illustrates a system 400 suitable for two users A and B. The lexicon 402 is subdivided into a generic component, 404, and user-specific extensions, 406 and 408. User A has text collections 410 and 412 associated with applications 102 and 104 respectively. User A extends the vocabulary by importing words from user A's text collections into the user-specific lexicon extension 406 that is associated with user A, as shown by the arrows 414 and 416. Similarly, user B extends the lexicon by importing from user B's text collections 418 and 420 into user B's lexicon extension 408, as indicated by arrows 422 and 424. During subsequent speech recognition, speech recognizer 106 extends the generic lexicon 404 with extension 406 when user A is using the device, and with extension 408 when user B is the user. This arrangement enables both users A and B to benefit from individualized vocabulary extension. While the above describes a two-user system, the device can support any number of users with individual text collections and their associated vocabulary extensions within the limits of the device's processing and storage capacities.

Examples of applications having associated text collections include the following: an address book with its associated proper names, nicknames, workplaces, addresses, email addresses, and other contact information; a calendar with its associated names of people, places, and other calendar entry information; a web browser with its associated list of favorite web addresses, standard web sites, sites visited by the user, search terms entered by the user, and web search results; a digital music player with its associated music genres, song titles, artist names, album names, and other music-related information; an emailer with its associated email addresses, received, sent, and draft email documents, and email attachments; a text messager with its associated sent and received text message documents; an instant messager with its associated sent and received text, and screen names; a word processor with its associated documents created or edited by the word processor; a camera with image captions; a video clip player with associated titles and comments; and a geolocation application with its associated maps containing geographic names, such as names of towns, streets, mountains, rivers, and lakes. In addition, text collections include information and words derived from monitoring voice communications transmitted from, or received by the mobile device. If the MCD has another, simpler speech recognizer associated with a voice dialer or another specific application, the words in the simpler recognizer's lexicon can also be imported into the large vocabulary lexicon.

Figure 5:
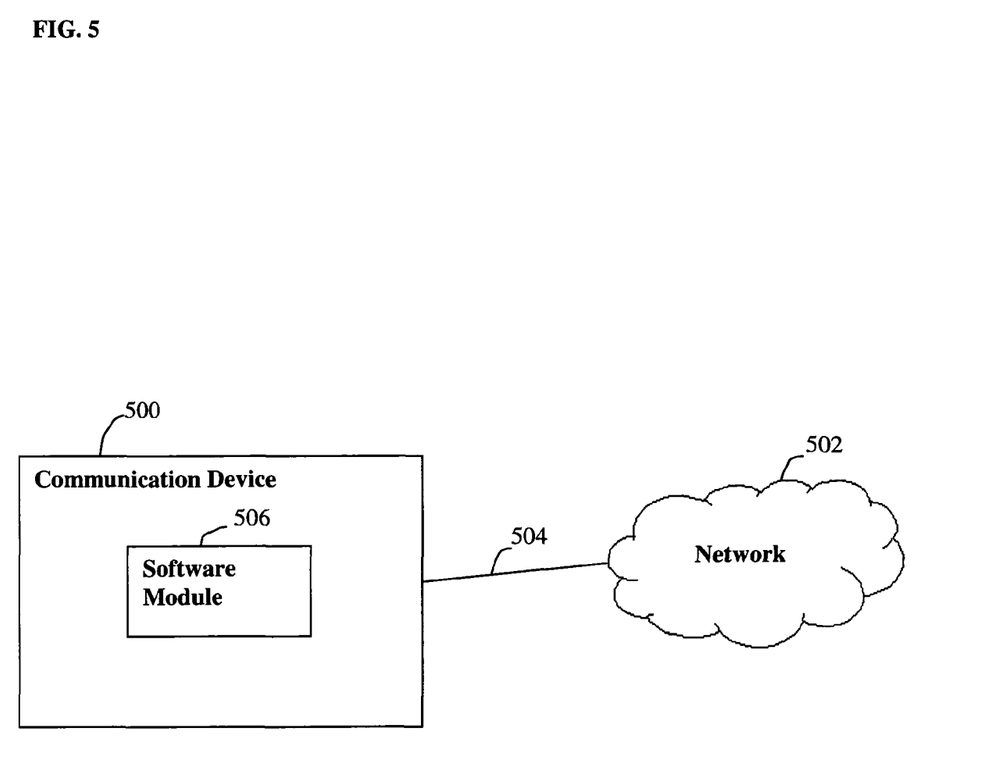
FIG. 5 is a block diagram of a communication device connected to a network.

The above techniques apply to non-mobile devices as well as to mobile devices that are connected to a network by either a wireless or by a wired connection, as illustrated by FIG. 5. The figure shows communication device 500 connected to network 502 via wired or wireless network connection 504. Network 502 can be a telephone network, or a data network such as the Internet. Communication device 500 includes software module 506 that contains lexicon 108 and speech recognizer 106 as discussed above in connection with mobile communication device 100.

The described techniques can also be used when the words to be added to the lexicon are not already stored on the mobile device, but are captured from a user's interaction with a network. In this case, software module 506 includes instructions for monitoring a user's interaction with network 502. When network 502 is the Internet, module 506 monitors text that is transmitted or received by the user. In a common situation, the user interacts with the Internet using a Web browser and module 506 monitors the user's search terms, search results, and Web pages accessed as a result of the search.

Network 502 may be a network that carries speech, such as a traditional telephone network, a digital voice network, or a 2G/3G wireless access network. In this case, the words to be added to the lexicon are contained within voice utterances carried over the telephone network to and from the device. The voice utterances are typically buffered in a memory located on the mobile device or on another device connected to a network. A speech recognizer executing locally on the device or executing on another device connected to the network monitors the stored speech and identifies particular words. Module 506 adds the recognized words to the lexicon, either automatically, or after a user screens them for misrecognized words.

Software module 506 accesses and captures words from the monitored network interaction, and adds some or all of the words to lexicon 108. This process takes place dynamically, so that software module 506 updates continuously during the user's network interaction. In other applications, software module 506 accesses the words at periodic intervals, or upon receipt of an instruction from the user. In still other applications, the words are accessed upon the occurrence of an event, such as the termination of the user's network interaction, or the powering down of the communication device.

The vocabulary extension process described above can be varied in a number of ways. For example, the device can omit one or more of the steps shown in FIG. 3, or perform the steps in a different sequence. In one variation, as referred to above for languages where the pronunciation is readily derived from the text using rules, the system omits step 308 and does not generate a pronunciation.

Figure 6:
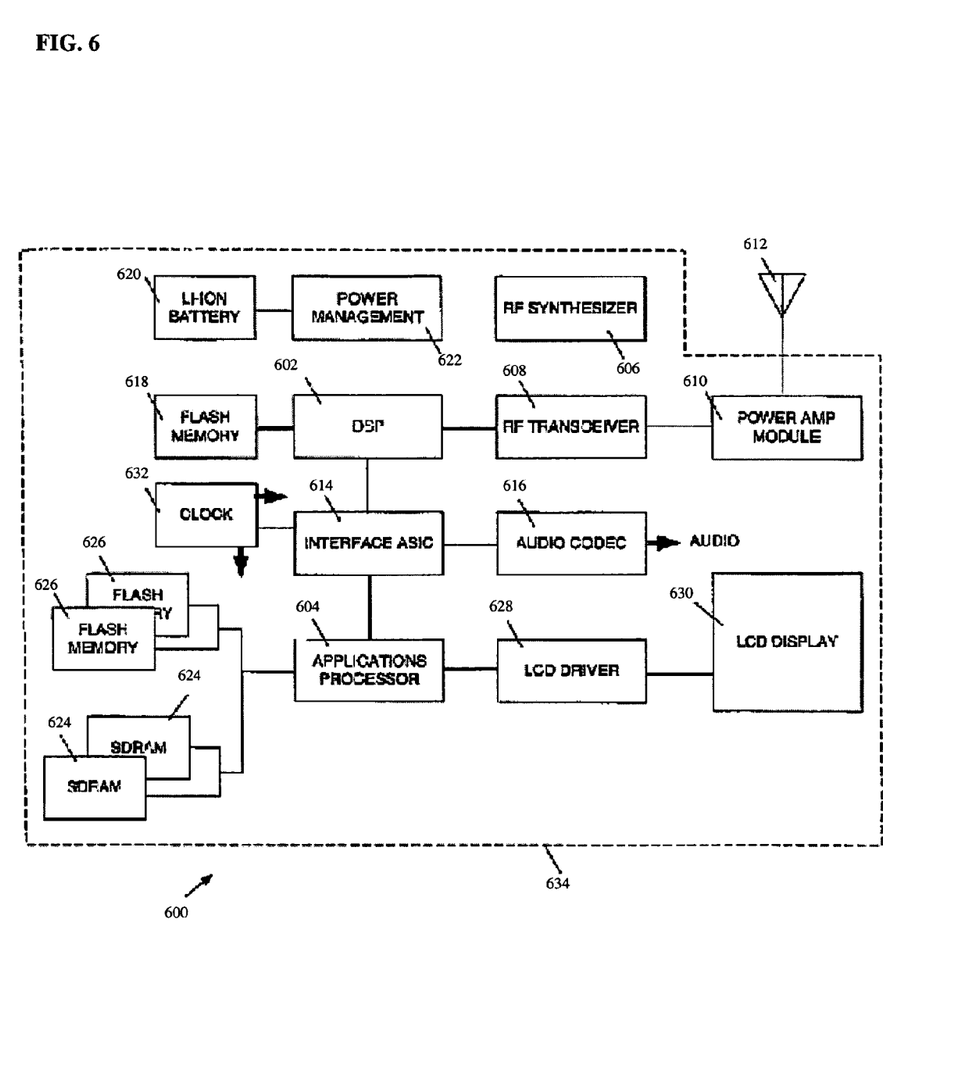
FIG. 6 is a high-level block diagram illustrating a hardware platform for a mobile communications device with speech recognition capability.

A typical platform on which a mobile communications device can be implemented is illustrated in FIG. 6 as a high-level block diagram 600. The device includes at its core a baseband digital signal processor (DSP) 602 for handling the cellular communication functions, including, for example, voiceband and channel coding functions, and an applications processor 604, such as Intel StrongArm SA-1110, on which the operating system, such as Microsoft PocketPC, runs. The phone supports GSM voice calls, SMS (Short Messaging Service) text messaging, instant messaging, wireless email, desktop-like web browsing along with traditional PDA features such as address book, calendar, and alarm clock. The processor can also run additional applications, such as a digital music player, a word processor, a digital camera, and a geolocation application, such as a GPS.

The transmit and receive functions are implemented by an RF synthesizer 606 and an RF radio transceiver 608 followed by a power amplifier module 610 that handles the final-stage RF transmit duties through an antenna 612. An interface ASIC 614 and an audio CODEC 616 provide interfaces to a speaker, a microphone, and other input/output devices provided in the phone such as a numeric or alphanumeric keypad (not shown) for entering commands and information. DSP 602 uses a flash memory 618 for code store. A Li-Ion (lithium-ion) battery 620 powers the phone and a power management module 622 coupled to DSP 602 manages power consumption within the device. The device has additional hardware components (not shown) to support specific functionalities. For example, an image processor and CCD sensor support a digital camera, and a GPS receiver supports a geolocation application.

Volatile and non-volatile memory for applications processor 614 is provided in the form of SDRAM 624 and flash memory 626, respectively. This arrangement of memory can be used to hold the code for the operating system, all relevant code for operating the device and for supporting its various functionality, including the code for the speech recognition system discussed above and for any applications software included in the device. It also stores the lexicon, as well as text collections associated with the applications.

The visual display device for the device includes an LCD driver chip 628 that drives an LCD display 630. There is also a clock module 632 that provides the clock signals for the other devices within the phone and provides an indicator of real time. All of the above-described components are packages within an appropriately designed housing 634.

Since the device described above is representative of the general internal structure of a number of different commercially available devices and since the internal circuit design of those devices is generally known to persons of ordinary skill in this art, further details about the components shown in FIG. 6 and their operation are not being provided and are not necessary to understanding the invention.

In view of the wide variety of embodiments to which the principles of the present invention can be applied, it should be understood that the illustrated embodiments are exemplary only, and should not be taken as limiting the scope of the invention. For example, the steps of the flow diagram may be taken in sequences other than those described, and more or fewer elements may be used in the diagrams. While various elements of the embodiments have been described as implemented in software, other embodiments in hardware or firmware implementations may alternatively be used, and vice-versa.

Other embodiments are within the scope of the following claims.

What is claimed is:

1. A method of improving the performance of a speech recognizer on a mobile device which enables a user to interact with a communications network, the method comprising:
   storing on the device a lexicon for the speech recognizer;
   monitoring a user's interaction over the network and capturing a plurality of words from the monitored interaction;
   storing on the device the captured plurality of words; and
   accessing the stored captured plurality of words and adding at least some of the captured plurality of words to the lexicon to improve the performance of the speech recognizer.

2. The method of claim 1, wherein monitoring the user's interaction with a network comprises monitoring the user's interaction with a Web browser, and wherein the captured plurality of words are taken from the user's interaction with the Web browser.

3. The method of claim 2, wherein the captured plurality of words are obtained from at least one of queries, search results, and Web pages accessed as a result of the user's interaction with the Web browser.

4. The method of claim 1, wherein monitoring the user's interaction with a network comprises monitoring the user's voice communication with one or more other parties via a telephone network, and wherein the captured plurality of words are taken from the user's voice communication with the one or more other parties via the telephone network.

5. The method of claim 1, wherein accessing the stored plurality of words is done dynamically.

6. The method of claim 1, wherein accessing the stored plurality of words is done at periodic intervals.

7. The method of claim 1, wherein accessing the stored plurality of words occurs in response to receiving an instruction from the user.

8. The method of claim 1, wherein accessing the stored captured plurality of words occurs in response to an occurrence of an event.

9. The method of claim 1, wherein the speech recognizer is biased in a manner that is based on a frequency of occurrence in the monitored interaction of words among the plurality of words.

10. The method of claim 1, wherein monitoring further comprises recording a classification of each of the plurality of words, and wherein the speech recognizer is biased in a manner that is based on the classification of each of the plurality of words.

11. The method of claim 1, wherein monitoring further comprises recording a usage context of each of the plurality of words, and wherein the speech recognizer is biased in a manner that is based on the usage context associated with each of the plurality of words.

12. The method of claim 1, wherein adding at least some of the captured plurality of words to the lexicon comprises generating phonetic representations of the at least some of the captured plurality of words and adding the phonetic representations of the at least some of the captured plurality of words to the lexicon.

\* \* \* \* \*